United States Patent
Kuru

(10) Patent No.: US 9,713,078 B2
(45) Date of Patent: Jul. 18, 2017

(54) SYSTEM AND METHOD FOR DETERMINING MOBILE DATA QUALITY OVER A NETWORK

(71) Applicant: Bahadir Kuru, Istanbul (TR)

(72) Inventor: Bahadir Kuru, Istanbul (TR)

(73) Assignee: Veloxity, Inc., Sunnyvale, CA (US)

( * ) Notice: Subject to any disclaimer, the term of this patent is extended or adjusted under 35 U.S.C. 154(b) by 143 days.

(21) Appl. No.: 14/207,422

(22) Filed: Mar. 12, 2014

(65) Prior Publication Data

US 2014/0269388 A1    Sep. 18, 2014

Related U.S. Application Data

(60) Provisional application No. 61/786,029, filed on Mar. 14, 2013.

(51) Int. Cl.
*H04W 48/18* (2009.01)

(52) U.S. Cl.
CPC .................. *H04W 48/18* (2013.01)

(58) Field of Classification Search
CPC ..................................... H04W 48/18
USPC ................................. 370/252, 315
See application file for complete search history.

(56) References Cited

U.S. PATENT DOCUMENTS

| | | | | |
|---|---|---|---|---|
| 6,263,282 B1 * | 7/2001 | Vallancourt | ............ | B60Q 1/525 340/425.5 |
| 6,677,858 B1 * | 1/2004 | Faris | ...................... | G06Q 30/06 340/573.1 |
| 7,009,952 B1 * | 3/2006 | Razavilar | .............. | H04W 36/14 370/331 |
| 7,664,465 B2 * | 2/2010 | Shen | ..................... | H04L 1/0002 370/252 |
| 2002/0000920 A1 * | 1/2002 | Kavner | ................ | G08G 1/0104 340/905 |
| 2002/0173271 A1 * | 11/2002 | Blair | .................... | H04B 1/1027 455/63.1 |
| 2004/0192342 A1 * | 9/2004 | Ranganathan | ...... | H04L 65/4092 455/456.1 |
| 2006/0153081 A1 * | 7/2006 | Simonsson | ............. | H04L 45/00 370/238 |
| 2007/0208493 A1 * | 9/2007 | Downs | ................. | G08G 1/0104 701/117 |
| 2007/0249387 A1 * | 10/2007 | Doradla | .................. | H04L 67/04 455/552.1 |

(Continued)

FOREIGN PATENT DOCUMENTS

CN    101827409 A  *  9/2010  ............ H04W 36/08

OTHER PUBLICATIONS

U.S. Appl. No. 14/550,937, filed Nov. 22, 2014, entitled "System and Method of Providing a Synthetic Transaction Platform for Analyzing Communication Between a Mobile Device and a Wireless Network" (Bahadir Kuru).

(Continued)

*Primary Examiner* — Parth Patel
(74) *Attorney, Agent, or Firm* — Neal Marcus

(57) ABSTRACT

A computer-implemented system is disclosed for determining mobile data quality over a network. The system includes one or more processors configured to execute computer program steps, the computer program steps comprising: collecting data from a mobile device; and determining an optimal an available WIFI network or cellular network for data transmission.

23 Claims, 16 Drawing Sheets

(56) References Cited

U.S. PATENT DOCUMENTS

| | | | |
|---|---|---|---|
| 2008/0234921 A1* | 9/2008 | Groenhuijzen | G01C 21/3415 701/118 |
| 2009/0203322 A1* | 8/2009 | Horn | H04W 72/082 455/67.13 |
| 2009/0307763 A1 | 12/2009 | Rawlins et al. | |
| 2010/0037284 A1* | 2/2010 | Sachs | H04L 43/0847 726/1 |
| 2010/0195562 A1* | 8/2010 | Ishizu | H04W 48/18 370/315 |
| 2010/0273508 A1* | 10/2010 | Parata | G08G 1/0104 455/456.1 |
| 2011/0276797 A1 | 11/2011 | Pedlow et al. | |
| 2012/0102094 A1* | 4/2012 | Park | H04L 65/4084 709/203 |
| 2012/0257585 A1* | 10/2012 | Sydor | H04W 72/082 370/329 |
| 2012/0314570 A1* | 12/2012 | Forenza | H04B 7/01 370/230 |
| 2012/0319988 A1* | 12/2012 | Schwartz | 345/174 |
| 2013/0018578 A1* | 1/2013 | Matsuo | G09B 29/106 701/431 |
| 2014/0081482 A1* | 3/2014 | Raynaud | G05D 1/12 701/3 |
| 2014/0135010 A1* | 5/2014 | Mohan | H04W 36/0083 455/436 |
| 2014/0248907 A1* | 9/2014 | Peroulas | G01S 11/10 455/456.1 |

OTHER PUBLICATIONS

Non-Final Office Action dated May 18, 2017 for U.S. Appl. No. 14/550,937, filed Nov. 22, 2014 (Bahadir Kuru).

* cited by examiner

| NETWORKS DETECTED | MAC ADDRESS | SECURITY PROTOCOLS | SIGNAL STRENGTH | FREQUENCY | CHANNEL |
|---|---|---|---|---|---|
| 1.luis_network | c0:3f:0e:1 | [WPA-PSK] | -84 | 2412 | 1 |
| 2.PP800 129 | 00:26:f2:0 | [WPA-PSK] | -89 | 2462 | 11 |
| 3.Mozilla-G | d8:c7:c8:9 | [WPA2-EA] | -84 | 2437 | 6 |
| 4.MTView_AP | 00:24:01:f | [WPA2-PS] | -82 | 2427 | 4 |
| 5.ATT128 | 94:cc:b9:9 | [WPA_PSK] | -89 | 2462 | 11 |
| 6.Mozilla Mobile | d8:c7:c8:9 | [WPA2-PS] | -86 | 2437 | 6 |
| 7.2WIRE677 | 00:14:95:0 | [WEP][ESS] | -79 | 2437 | 6 |
| 8.GoogleWiFi | 00:0d:97:0 | [ESS] | -72 | 2462 | 11 |
| 9.West of Eden | 00:27:22f | [WPA2-PS] | -66 | 2437 | 6 |

FIG. 5

| NETWORKS DETECTED | MAC ADDRESS | SECURITY PROTOCOLS | SIGNAL STRENGTH | FREQUENCY | CHANNEL |
|---|---|---|---|---|---|
| 1.luis_network | c0:3f:0e:1 | [WPA-PSK] | -84 | 2412 | 1 |
| 2.PP800_129 | 00:26:f2:0 | [WPA-PSK] | (-89) | 2462 | (11) |
| 3.Mozilla-G | d8:c7:c8:9 | [WPA2-EA] | -84 | 2437 | 6 |
| 4.MTView_AP | 00:24:01:f | [WPA2-PS] | -82 | 2427 | 4 |
| 5.ATT128 | 94:cc:b9:9 | [WPA_PSK] | (-89) | 2462 | (11) |
| 6.Mozilla_Mobile | d8:c7:c8:9 | [WPA2-PS] | -86 | 2437 | 6 |
| 7.2WIRE677 | 00:14:95:0 | [WEP][ESS] | -79 | 2437 | 6 |
| 8.GoogleWiFi | 00:0d:97:0 | [ESS] | (-72) | 2462 | (11) |
| 9.West of Eden | 00:27:22f | [WPA2-PS] | -66 | 2437 | 6 |

FIG. 6

THE NOISE (SINR CALCULATION CODE) CALCULATION

```
DOUBLE NOISE=CONVERSION.DESIBELTOMILLIWATT(WIFISCANRESULT.GETSIGNALLEVEL());
CHANNELINFO CHANNELINFO=NULL;
APGROUP APGROUP=NULL;
STRING CURRENTBSSID=WIFISCANRESULT.GETBSSID();
IF (WIFIINFO.CHANNELMAP.CONTAINSKEY(CHANNEL)){
        APGROUP=GETAPGROUP(APGROUPLIST, CURRENTBSSID);
        IF (APGROUP==NULL) {
                APGROUP=NEW APGROUP();
                APGROUP.SETBSSID(CURRENTBSSID):
                APGROUP.SETSIGNALLEVEL(WIFISCANRESULT.GETSIGNALLEVEL());
                APGROUPLIST.ADD(APGROUP);
                CHANNELINFO=WIFIINFO.CHANNELMAP.GET(CHANNEL);
                CHANNELINFO.=SETAPCOUNT(CHANNELINFO.GETAPCOUNT()+1);
                CHANNELINFO.SETNOISELEVEL(CHANNELINFO.GETNOISELEVEL()+NOISE):
        }
} ELSE {
        APGROUP=NEW APGROUP();
        APGROUP.SETBSSID(CURRENTBSSID);
        APGROUP.SETSIGNALLEVEL(WIFISCANRESULT.GETSIGNALLEVEL());
        APGROUPLIST.ADD(APGROUP);
        CHANNELINFO=NEW CHANNELINFO();
        CHANNELINFO.SETCHANNEL(CHANNEL);
        CHANNELINFO.SETAPCOUNT(1);
        CHANNELINFO.SETNOISELEVEL(NOISE);
        WIFIINFO.CHANNELMAP.PUT(CHANNEL, CHANNELINFO);
}
```

SINR ILLUSTRATION CODE

```
DOUBLE SINR=ITEM.GETSINR();

IF(SINR<=6) {
        PBPOLLUTION.SETPROGRESSDRAWABLE(CONVERTVIEW.GETRESOURCES().GETDRAWABLE(R.DRAWABLE.RED_PROGRESSBAR));
} ELSE IF (SINR<=15) {
        PBPOLLUTION.SETPROGRESSDRAWABLE(CONVERTVIEW.GETRESOURCES().GETDRAWABLE(R.DRAWABLE.ORANGE_PROGRESSBAR));
} ELSE IF (SINR<=25) {
        PBPOLLUTION.SETPROGRESSDRAWABLE(CONVERTVIEW.GETRESOURCES().GETDRAWABLE(R.DRAWABLE.YELLOW_PROGRESSBAR));
} ELSE {
        PBPOLLUTION.SETPROGRESSDRAWABLE(CONVERTVIEW.GETRESOURCES().GETDRAWABLE(R.DRAWABLE.GREEN_PROGRESSBAR));
}
PBPOLLUTION.SETTEXT(NEW DECIMALFORMAT("#.#.#").FORMAT((SINR)));
```

FIG. 8

| | | | STATUS | MOBILE | | WIFI | APPS |
|---|---|---|---|---|---|---|---|
| | YOUTUBE | | | M | | 5.94MB | 5.63KB |
| | | | | W | | 173MB | 102KB |
| | VELOXITY | | | M | | 0.00B | 0.00B |
| | | | | W | | 6.25MB | 3.63MB |
| | COM.SEC.ANDROID. PROVIDERS.DOWNLOADS | | | M | | 0.00B | 0.00B |
| | | | | W | | 6.63MB | 815B |
| | EMAIL | | | M | | 0.00B | 0.00B |
| | | | | W | | 745KB | 17.65KB |
| | FACEBOOOK | | | M | | 46.25KB | 26.17KB |
| | | | | W | | 73.10KB | 43.66KB |
| | DROPBOX | | | M | | 0.00B | 0.00B |
| | | | | W | | 76.61KB | 26.84KB |
| | OOVOO | | | M | | 5.46KB | 2.77KB |
| | | | | W | | 67.67KB | 24.32KB |
| | GOOGLE CONTACTS SYNC | | | M | | 7.22KB | 5.93KB |
| | | | | W | | 48.12KB | 35.33KB |
| | GOOGLE PLAY STORE | | | M | | 0.00B | 0.00B |
| | | | | W | | 42.39KB | 10.44KB |
| | MAPS | | | M | | 0.00B | 0.00B |
| | | | | W | | 13.56KB | 13.31KB |
| | SAMSUNG PUSH SERVICE | | | M | | 7.03KB | 1.40KB |
| | | | | W | | 13.71KB | 3.17KB |
| | TWITTER | | | M | | 0.00B | 0.00B |
| | | | | W | | 17.13KB | 6.00KB |
| | VIBER | | | M | | 1.68KB | 1.38KB |
| | | | | W | | 3.28KB | 3.76KB |
| | SKY.FM | | | M | | 0.00B | 0.00B |
| | | | | W | | 4.77KB | 1.69KB |
| | GMAIL | | | M | | 0.00B | 0.00B |

FIG. 15

SYSTEM AND METHOD FOR DETERMINING MOBILE DATA QUALITY OVER A NETWORK

CROSS-REFERENCE TO RELATED APPLICATIONS

This application claims priority to U.S. provisional application Ser. No. 61/786,029, filed Mar. 14, 2013, which is incorporated by reference herein.

FIELD OF THE INVENTION

The present invention relates to a system and method for determining mobile data quality over a network.

BACKGROUND OF THE INVENTION

The wireless industry measures mobile data quality in an attempt to improve network quality and user experience. In practice today, current technology for measuring network performance typically involves a simple speed test wherein a test file is uploaded and downloaded for measuring throughput. Unfortunately, this type of test is not very accurate. Further, it does not allow a user to control mobile data quality or allow a mobile network operator to have control over its own network. The reason for this is because the management and control over mobile networks is complex. WIFI which is added to a heterogeneous network (HetNet) structure today, creates a greater challenge in terms of management (if it is added to the mix). The main reason for this is that WIFI is still a black box from the perspective of a mobile network (end). This makes WIFI difficult to manage. Suffice it to say, monitoring and management of both the mobile network and WIFI network together are difficult.

Therefore, it would be advantageous to provide a system and method that overcomes the disadvantages with systems described above.

SUMMARY OF THE INVENTION

A system and method is disclosed for determining mobile data quality over a network.

In accordance with an embodiment of the present invention, a computer-implemented system is disclosed for determining mobile data quality over a network. The system includes one or more processors configured to execute computer program steps, the computer program steps comprising collecting data from a mobile device; and determining an optimal a available WIFI network or cellular network for data transmission.

In accordance with another embodiment of the present invention, a computer-implemented system is disclosed for determining mobile data quality over a network. The system includes a server having a processor configured to execute computer program steps, the computer program steps comprising receiving data collected from a mobile device and calculating the average speed of data transmitted over a network.

In accordance with yet another embodiment of the present invention, a computer-implemented system for determining mobile data quality over a network, the system including a mobile device having a processor configured to execute computer program steps, the computer program steps comprising collecting data from a mobile device and determining an optimal an available WIFI network or cellular network for data transmission.

In accordance with yet another embodiment of the present invention, a computer-implemented system for determining mobile data quality over one or more networks, the system including one or more processors configured to execute computer program steps, the computer program steps comprising collecting data from a plurality of mobile devices communicating over one or more networks and determining a network having optimal data quality for communication from a plurality of available networks.

BRIEF DESCRIPTION OF THE DRAWINGS

FIGS. 5 and 6 are the same example of signal strength of local WIFI networks for calculating SINR.

FIG. 8 depicts sample codes sections for (1) the interference calculation and (2) SINR code for result presentation.

FIG. 15 is another representation of a screenshot on a mobile device depicting an "apps" tab in accordance with the present invention.

DETAILED DESCRIPTION OF THE INVENTION

Figure 1:
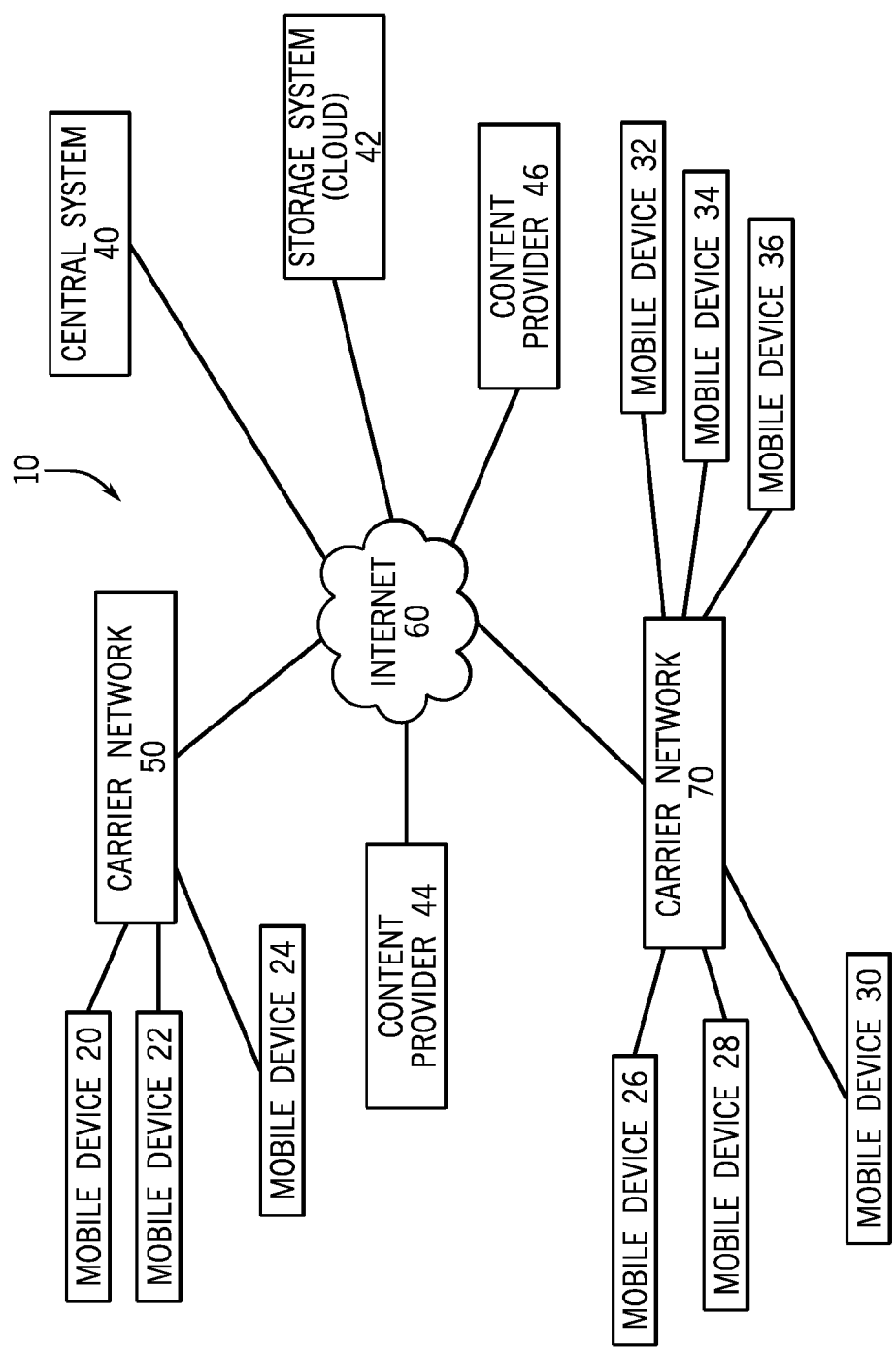
FIG. 1 depicts a block diagram of a network incorporating a system for determining mobile data quality (over a network) according to an embodiment of the present invention.

FIG. 1 depicts a block diagram of a network 10 incorporating a system for determining mobile data (communication) quality (over a network) according to an embodiment of the present invention. Network 10 comprises carrier networks 50, 70 (i.e., mobile networks or cellular networks) and a plurality of mobile devices 20-24, mobile devices 26-36 and content providers 44, 46. Mobile devices are also known as "cell phones." Mobile devices 20-24 and 26-36 are adapted to wirelessly access mobile content from content providers 42, 44 over the Internet 60 via carrier networks 50, 70 as known by those skilled in the art. (Data quality will be determined typically over several networks (WIFI networks and mobile network) at any given time as discussed below.) Examples of carrier networks include Verizon, Sprint, AT&T and T-Mobile. (Carrier network is also referred to as a mobile network or cellular network as known to those skilled in the art and these terms are used interchangeably in this disclosure.)

Network 10 further comprises central system 40. Central system 40 and mobile 20-24, 26-36 devices shown in FIG. 1 (via a carrier network and Internet 60) act together as or constitute part of the system for determining mobile data quality in accordance with an embodiment of the present invention. Central system 40 includes one or more servers as known to those skilled in the art. At least one server is adapted including an interface adapted to communicate with Internet 60 as described below.

Mobile devices include cell phones, smart phones, PDAs, and other devices that allow a user to communicate through the carrier networks. A typical mobile device has a processor, storage (ROM and RAM memory), interface and antenna to enable the device to communication with a carrier network, and other components as known to those skilled in the art. A user of a mobile device typically has over 20 applications stored on such device to access content over Internet 60. For example, a mobile device may include (1) social networking applications such as Facebook, Twitter and LinkedIn, (2) news applications such as Mercury News, Washington Post, CNN, and several news aggregators, (3) game applications, (4) video content distributors and aggregator applications such as YouTube, (5) web browsers and (6) many, many more applications. Each of these applications may also enable a user to access video and other content that requires large volumes of data transmission.

Although two carrier networks are shown, any number of carrier networks may be employed as known to those skilled in the art. Similarly, nine mobile devices are shown, but those skilled in the art know that any number of mobile devices may be employed. In the typically mobile environment, thousands of mobile devices are wirelessly coupled to a carrier network at any given time.

Figure 16:
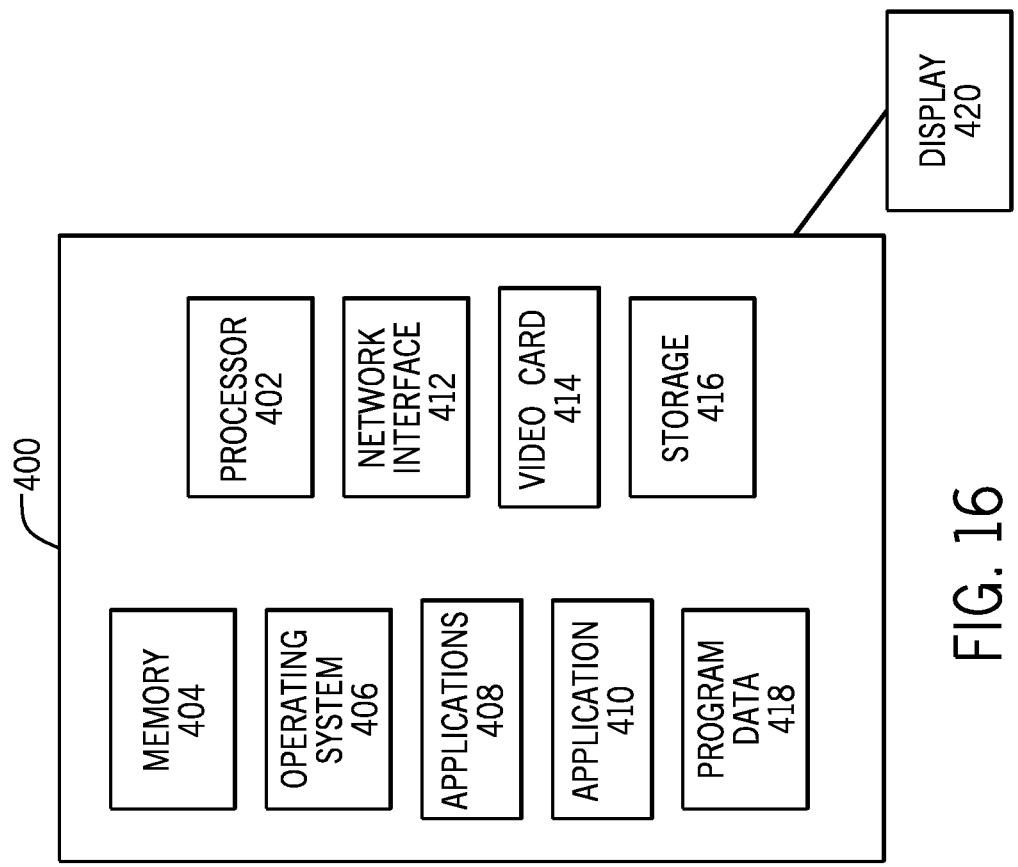
FIG. 16 depicts a block diagram of a general purpose computer to support the embodiments of the systems and methods disclosed in this application.

As known to those skilled in the art, central system 40 and content providers 42, 44 each include one or more computer servers and optionally displays. Each server includes one or more processors, memory, network interfaces, hard drives, video cards and other conventional components known to those skilled in the art. These servers typically run Unix or Microsoft server as the operating system and the servers include TCP/IP protocol stack (to communicate) as known by those skilled in the art. A representative server is shown in FIG. 16. The content providers also include a web server along with other servers hosted by the content provider as known by those skilled in the art.

Figure 2:
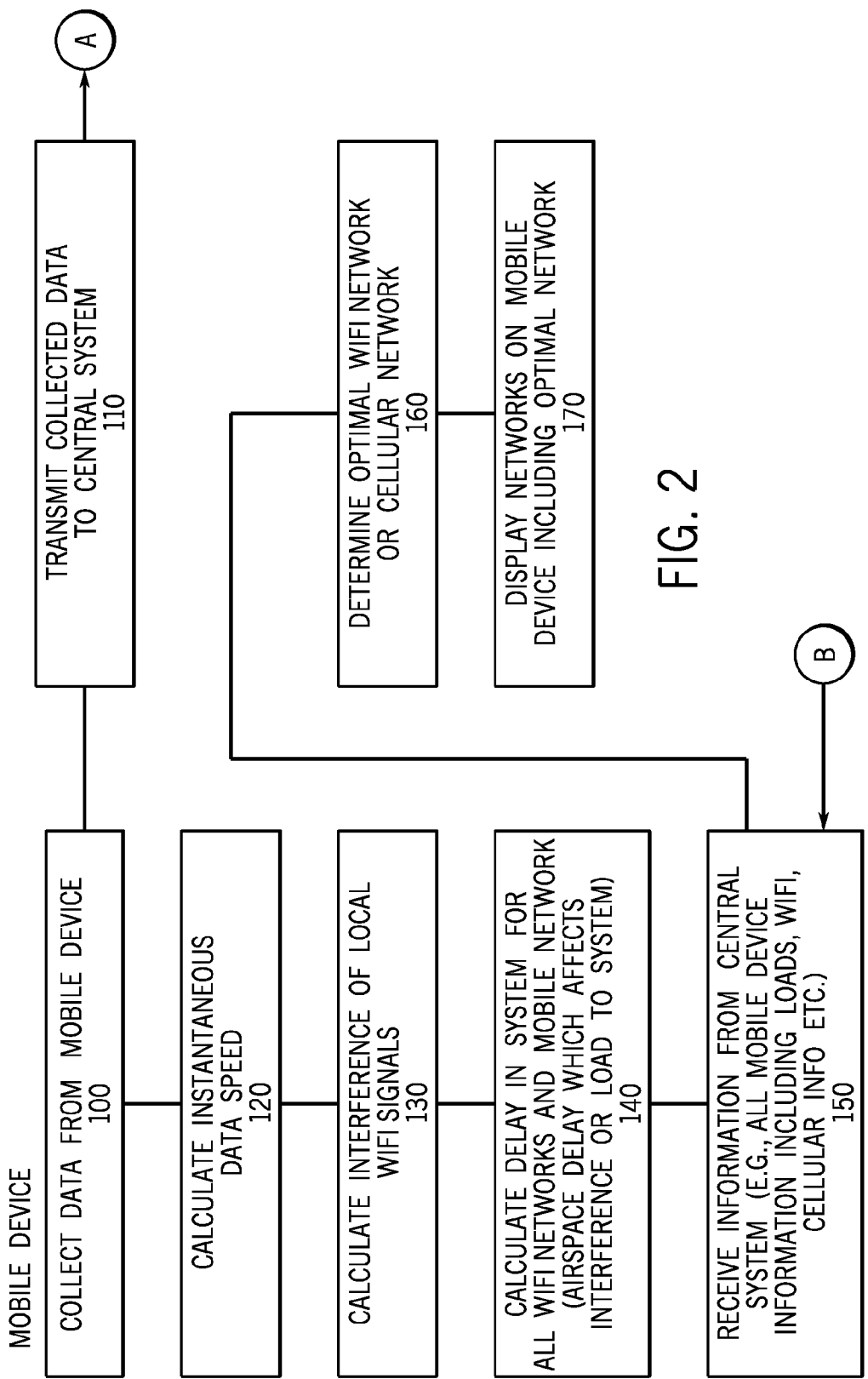
FIG. 2 depicts a flowchart of the steps of the method implemented in a mobile device of the system for determining mobile data quality shown in FIG. 1 in accordance with an embodiment of the present invention.
Figure 3:
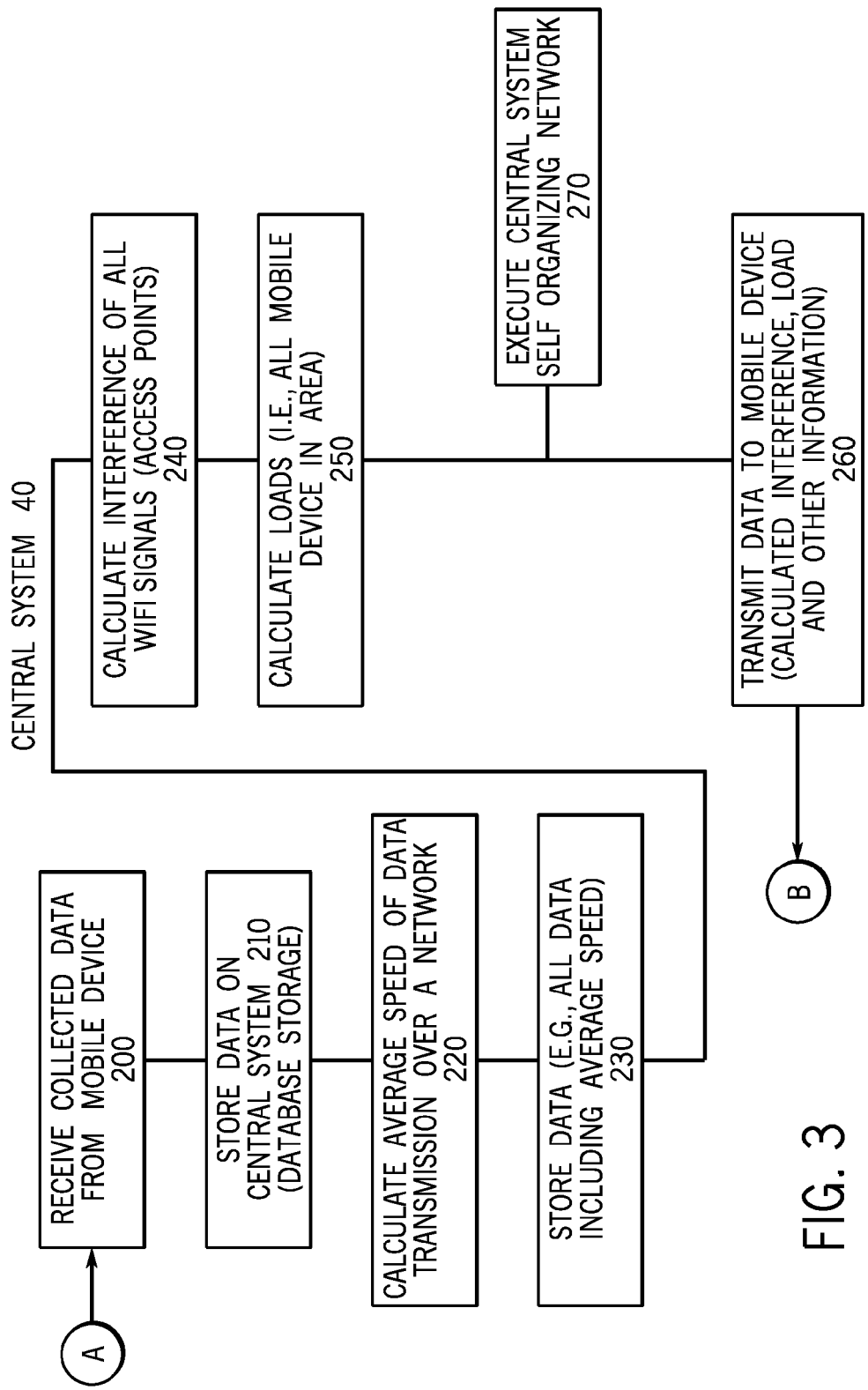
FIG. 3 depicts a flowchart of the steps of the method implemented in the central system of the system for determining mobile data quality shown in FIG. 1 in accordance with an embodiment of the present invention.

FIG. 2 depicts a flowchart of the steps of the method implemented in a mobile device of the system for determining mobile data quality shown in FIG. 1 in accordance with the present invention. FIG. 3 depicts a flowchart of the steps of the method implemented in central system 40 of the system for determining mobile data quality shown in FIG. 1 in accordance with the present invention. As indicated above, the mobile device (22-24, 26-36) and the central system 40 function together as the system for determining mobile data quality. Therefore, the steps in the flowcharts work together, i.e., represent a method for performing the determining mobile data quality. The method steps of these flowcharts will be discussed together when possible.

Referring to FIG. 2, execution of the method begins at step 100 wherein data is collected from a mobile device (at a mobile device 20-24, 26-36). Data is collected as data is used (i.e., as data is carried). The data collected on a mobile device does not include any user personal information. The data relates to the parameters or characteristics of a mobile device and its usage. In brief, these parameters include (a) mobile device information such as device type, model, operating system type and version, (b) operating information such as carrier name, mobile country code, (c) subscriber information, (d) geographic information such as latitude and longitude, (e) LTE network information (if applicable), (f) UMTS or CDMA network information, (g) detected WIFI network information, and (h) mobile device active application information (list of active mobile device applications). More details on the collected data are described below in Appendix A below.

Figure 4:
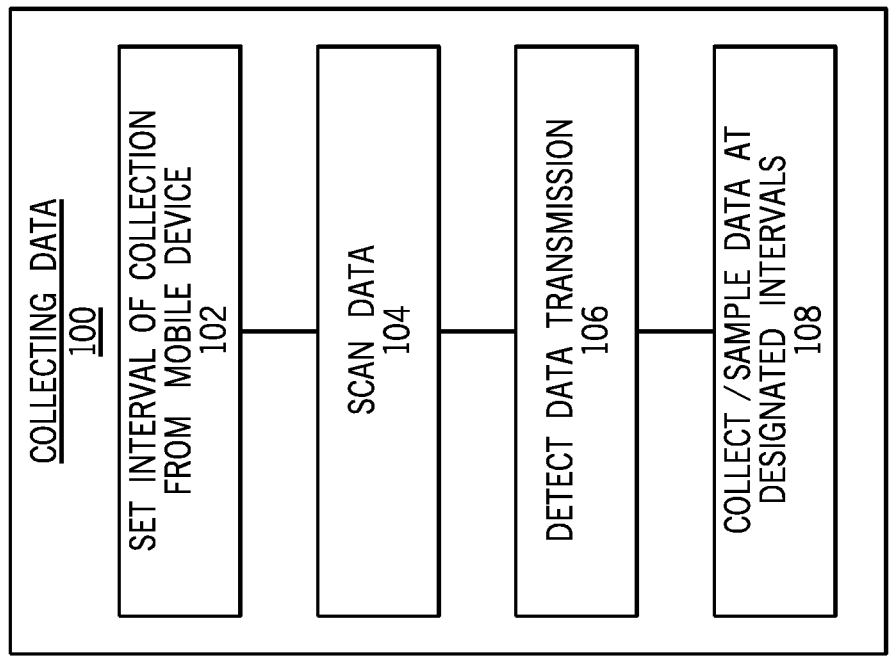
FIG. 4 depicts a flowchart of the method sub-steps of the collecting step in FIG. 2.

It is noted that execution step 100 is functionally broken down in sub-steps as shown in FIG. 4. In FIG. 4, execution of collecting step 100 begins when the interval period for collecting data from a mobile device is set at sub-step 102. A user may set the interval period in the application on the mobile device. Five second intervals are preferred but any interval period may be set for collection as described below. At sub-step 104, data usage is scanned. In operation, scanning continually occurs and preferably, at one second time periods. Repeated scanning does not consume mobile device battery life or CPU time. Next, when data transmission is detected during the interval at sub-step 106, data is then collected (i.e., sampling occurs) at the set intervals at sub-step 108. With the exception of the mobile device type, operating system, all data described in this application including data volume is repeatedly collected every interval period. Data is detected when usage is shown to increase. (That is, data is monitored during intervals. Data movement during such intervals means begin collection. Data is collected only during these intervals.)

Returning to the method in FIG. 2, execution moves to steps 110 wherein the data collected is transmitted to central system 40. Alternatively, the collected data may be sent to cloud server 42 for central system 40 to subsequently use.

Execution then moves to step 120 wherein the instantaneous speed over two consecutive interval periods is calculated. The calculation is based on the following equation.

$$\text{Instantaneous speed} = (\text{DataVolume2} - \text{DataVolume1}) / \text{Interval1}$$

where, for example, DataVolume1 and DataVolume2 are volumes of data at the beginning and ending of interval 1. Interval1 is the first interval period. The calculations are then stored on the mobile device (not shown) for later use. (E.g., storage duration is limited to the data upload time which can be every 10 minutes to 1 hour.) The stored data is used for a real time personal self-organizing network (SON) and gaming as described below.

Execution then moves to step 130 wherein the interference of local WIFI network signals is calculated (i.e., measured and determined). WIFI networks are also called access points ("AP"). In short, the calculation involves measuring the interference signals for all interference (at WIFI channel), convert the signals from dBm (decibel-milliWatts) into mW (milliWatts) to add the signals, sum all interference signals in mW, convert the sum back into dBm and then compare signals of transmission with accumulated interference signals and obtain the difference in signal strength. If the difference is positive (above a threshold), then the transmission is better than the interference. This difference is called the Signal Interference to Noise Ratio (SINR). This relationship or equation is represented as follows (SINR):

SINR=Signal Level(at connected WIFI)−Signal Level of Total Interference.

As indicated, SINR, the difference between the carrier signal strength and the total interference, shall optimally be at a level as high as possible so that the speed is also high. High speed facilitates the delivery of the video content. Note again that data is collected in small intervals (in 1 to 5 seconds) and data is detected when there is a transmission of data. Data is collected from all mobile devices, as the SINR value will change from location to location or time to time. Even the mobile device brand will change the SINR. So the data collected during transmission, in different locations, at different times, from different devices is significant. At each measurement (every 1 to 5 seconds), the frequency or channel number of the carrier and the interfering WIFI signals (other APs with the same channel number) are compared.

FIGS. 5 and 6 are the same example of signal strength of the local WIFI networks for calculating SINR. In FIG. 5, a table is shown that identifies five columns: (1) list of networks detected, (2) Mac Address of a WIFI network (AP), (3) security protocols for each network, (4) the signal strength for each network signal in dBm, (5) frequency, (6) the channel (at frequency). At #8 in the table, GoogleWIFI has a signal strength of −72 dBm (as circled). If there are no interfering signals, the minimum background interference is assumed to be −110 dBm. Thus, the SINR equals −72−(110)=38.

When there are interfering signals, this is identified in FIG. 6. (The table in FIG. 6 has the same list of columns.) For this example, carrier channel 11 is chosen. Therefore, other signals that broadcast on channel 11 will interfere severely, if their signals are strong enough and if there is actual traffic on them. The total interference level first needs to be determined. The total cannot be determined by using the signal strength values directly. In this case, network #2 (PP800 129—circled) and #5 (ATT128—circled) are interfering signals. Both the signal strength values are −89 dBm. This must be converted to mW. The equation used for conversion is as follows:

$$P_{(mW)} = 10^{(signal\ strength\ in\ dBm/10)}.\ \text{Where P= Power in mW.}$$

Figure 7:
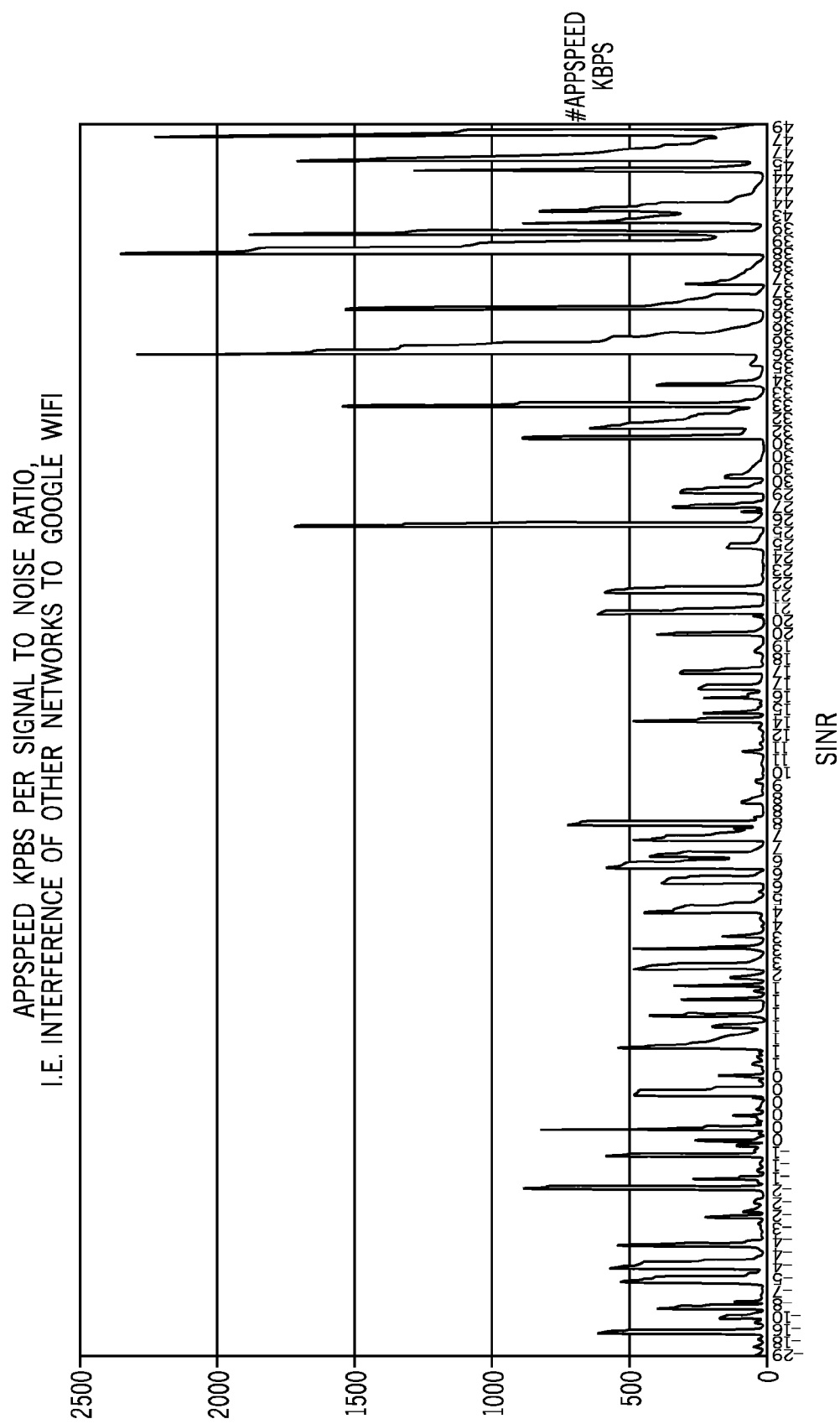
FIG. 7 depicts a graph of a sample practical implementation of application speed to SINR.

Thus, in this case, $\text{Power}_{(mW)} = (10^{-89/10}) = 1.26e^{-09}$ mW. Since there is two interfering signals, they are added; $1.26e^{-09} + 1.26e^{-09} = 2.52e^{-09}$. Now, this value is the total interference in mW. Now, this is converted back into dBm. The equation $\text{Log}_{10}(P_{mW})$ is used. That is, $\text{Log}_{10}(2.52e^{-09}) = -85.99$ dBm. So, the calculated value of SINR=−72−(−85.99)=13.99. This is total interference level. The graph in FIG. 7 depicts a practical implementation of this level, incorporating 874 measurements during video download of approximately 70 minutes. The graph indicates that the SINR affects speed in real time. This location is Mountain View, Calif. Note that the higher SINR, the better the transmission speed (kbps). (In practice, a threshold is used for SINR. When it is crossed, the speed level increases. This is an expected behavior. The important thing is that the SINR exceeds the interference level. Other factors related to speed may affect its outcome, as long as the interference exceeds the SINR level above. This is described below in more detail.). The SINR (interference) values are then stored (but not shown in FIG. 2).

FIG. 8 depicts sample Java codes sections for (1) the interference calculation (SINR calculation) and (2) SINR code result presentation (shown in lower part of figure). That is, the first section is the calculation, containing the SINR calculation and algorithm. The second section is coding for how the result is presented in the mobile application in accordance with the present invention.

Returning to FIG. 2, execution moves to step 140 wherein the delay for all local WIFI networks (i.e., local to a mobile device) and local mobile (cellular) network are calculated. The delay is in the airspace between the mobile device and WIFI base stations. The delay could be from a source or anywhere within the chain of data transmission. A mobile device will ping the base station to determine any delays. These values will also be stored (not shown in FIG. 2).

Execution then moves to step 150 wherein information from central system 40 is received. At this point, reference is now made to the flowchart in FIG. 3 wherein the steps of the method implemented in central system 40 of the system for determining mobile data quality are shown. At step 200, central system 40 will receive the collected data from a mobile device (20-24, 26-36) from step 100 in FIG. 2. The collected data is stored in storage (memory) such as in a database within central system 40 at step 210.

Execution moves to step 220 wherein the average speed of the data transmission over a network is calculated. Any mobile application data delivery quality is primarily measured by the speed, or in other words, throughput which is the speed of data obtained in short intervals, such as a second or less. Data speed of a particular application over a given service period of time can be represented by maximum speed, minimum speed or the average. The average speed is the unique number to represent the entire experience during a data transmission of an application for a given time period. However, as the data is transmitted for most applications during the specified time, the data transmission would not be continuous but in bursts instead.

Therefore, the calculation of average speed of the data takes into consideration the highest bursts, where more data is transmitted during service or usage. That is, the calculation is weighted in favor of the higher data speeds. The low transmission volume or the lowest bursts, however, are not eliminated but contribute less to the number representing the service average. This is done using the equation below.

Average Speed=Σ((DataVolume/Time)*DataVolumeφ)/(ΣDataVolume).

In detail, $speed_1 = (V_2 - V_1)/T_1$; $speed_2 = V_3 - V_2/T_2$. The same goes for $speed_3$, $speed_i$. The speed multiplied by the volume equals a value called SpeedVolume. Datavolumeφ is the amount of data delivered in MB (Megabytes) or KB (Kilobytes). The summation of Speedvolumes ((i.e., $speed_1*TotalVolume_1) + (speed_2*TotalVolume_2) + (speed_i*TotalVolume_i))$ divided by the summation of the volumes $(V_2 - V_1 + V_3 - V_2 + \ldots V_i - V_{i-1})$ equals the average speed. The average speeds of the data transmission over a network are then stored at step 230.

Execution moves to step 240 wherein the interference of all WIFI signals (APs) are calculated (SINR). This calculation is similarly performed with respect to step 130 in FIG. 2 described above. Therefore, details will not be discussed here.

Execution continues to move to step 250 wherein the loads for all mobile devices in the area are calculated. There are essentially two ways to calculate loads. (1) The first is when the mobile operator cooperates and provides access to its WIFI network or cellular network (network tower information). In this case, all loads passing through can be calculated. In the second instance, however, when there is no access, there are two basic information types to be used. First information type: identify all of the users of central system 40 connected to the cellular or WIFI network and second information type: for a WIFI network, measure the maximum speed of the WIFI network. (2) The second way to calculate load is to evaluate with interference information there, in order to understand if a possible low maximum speed is caused by interference and load. The two types of information will enable accurate approximation for a load.

The interference and load information is stored within central system 40 (not shown in FIG. 3). This information along with collected (accumulated) mobile device, WIFI and cellular information is then transmitted to the mobile device at step 260.

Turning back to step 150 of the method shown in FIG. 2, all of this information stored within central system 40 described above is received by the mobile device.

Figure 9:
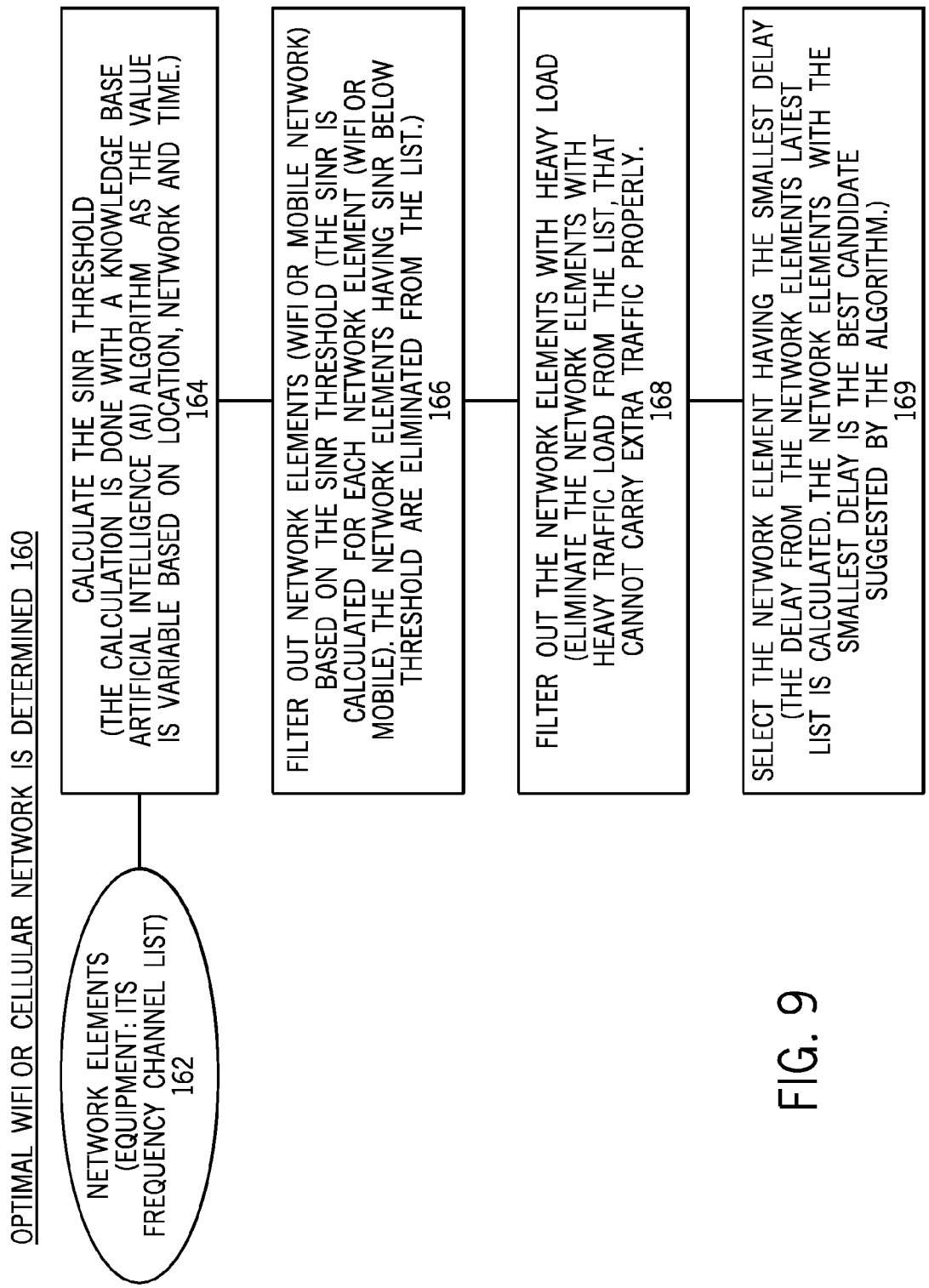
FIG. 9 depicts a personal self-organizing algorithm for a user's mobile device shown in FIG. 1.

At step 160, optimal WIFI network or cellular network (e.g., LTE/UMTS/CDMA/etc.) is determined. Step 160 is accomplished with the sub-steps shown in the flowchart of FIG. 9. The flowchart represents a personal self organizing network (SON), i.e., a SON that is personal to mobile device user. It works in the mobile device, gives the device intelligence to select the best performing network and increases quality and availability for the user.

The system begins with a list of network elements (equipment) channel frequency list 162 (not a step but information to complete following sub-steps). This is a list of the network elements that use certain channels frequently. In this context, network elements mean WIFI networks and/or cellular networks (i.e., mobile networks). At sub-step 164, the SINR threshold is calculated. The threshold calculation is done with a Knowledge Base Artificial Intelligence (AI) Algorithm as known those skilled in the art as the value is variable based on location, network and time. The network elements (WIFI or mobile network (i.e., cellular network)) are removed or filtered out based on the SINR threshold as sub-step 166. The SINR is calculated for each network element (mobile network or WIFI). The network elements having an SINR below the threshold are eliminated from the list. Then, the network elements with the heaviest loads are eliminated from the list (filtered out) at sub-step 168. They cannot carry the extra traffic properly. Finally, the network element is selected that has the smallest delay at sub-step 169. The delays from the network elements latest list are calculated. The network elements with the smallest delay times are the best candidates suggested by the application (algorithm) in accordance with the present invention.

Figure 11:
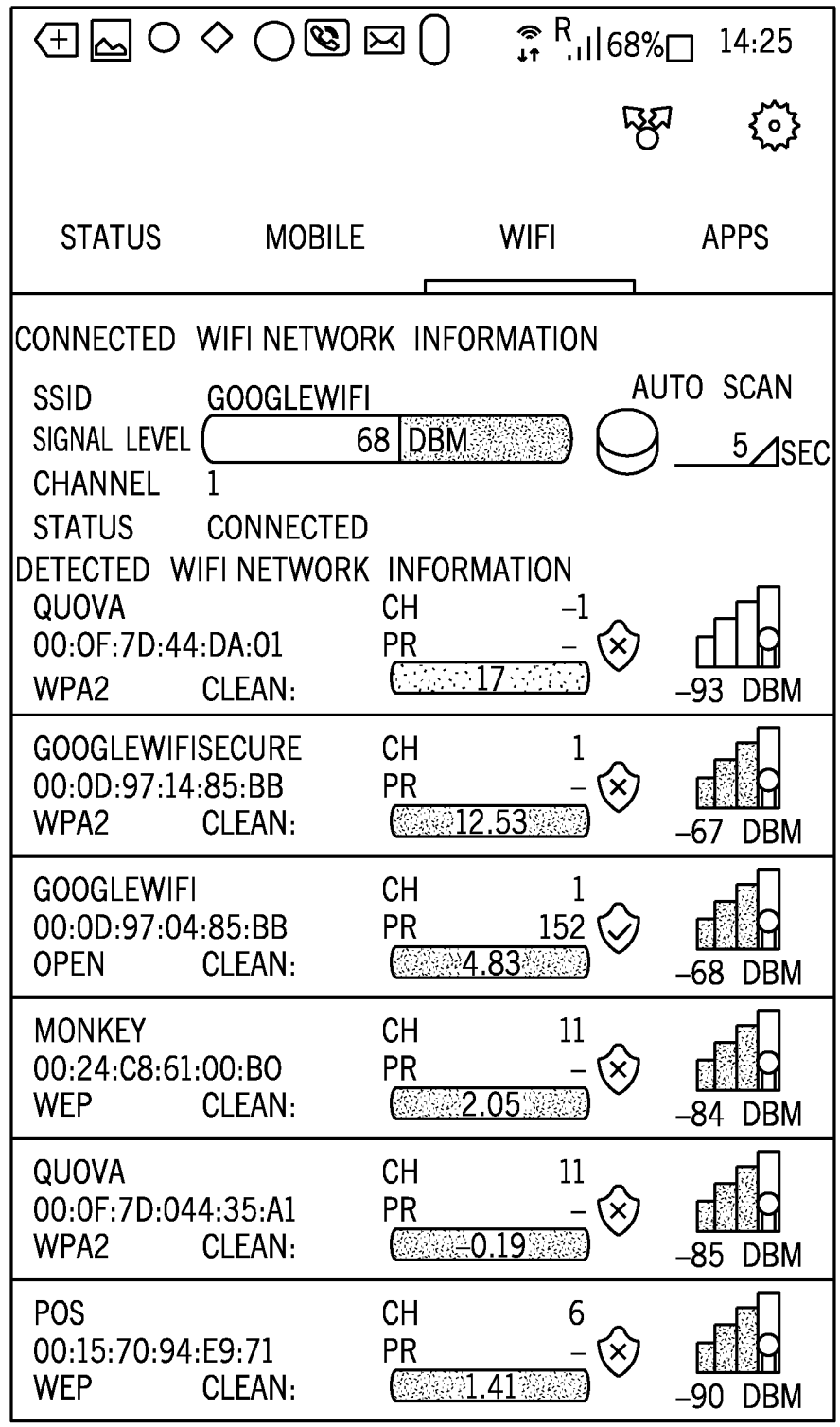
FIG. 11 is a representation of a of a screen shot of the application depicting a list of networks along with network information in accordance with an embodiment of the present invention.

Returning to FIG. 2, execution then proceeds to step 170 wherein the user's mobile device will display the available networks and optimal networks. The information shall include signal strength (quality of signal) and other desired information such as channel number, SINR, and open or secured network (examples). A representation of a (example) screen shot of the mobile device application depicting these networks are shown in FIG. 11 (WIFI Tab screen shot) in accordance with an embodiment of the present invention. In this FIG. 11, the quality of WIFI radio signal is calculated for all WIFI signals available at a particular spot. Colors and numbers are preferably used as the result of the SINR calculation but any indicia may be used to represent the results of the SINR calculation as known by those skilled in the art. The higher the SINR, the better the channel quality, so the color tone may be increased (e.g., it may show a darker green shade for this). The user can therefore choose the best quality channel. The same information here is used by central system 40 to clean up, i.e., remove the interfered channels.

Figure 10:
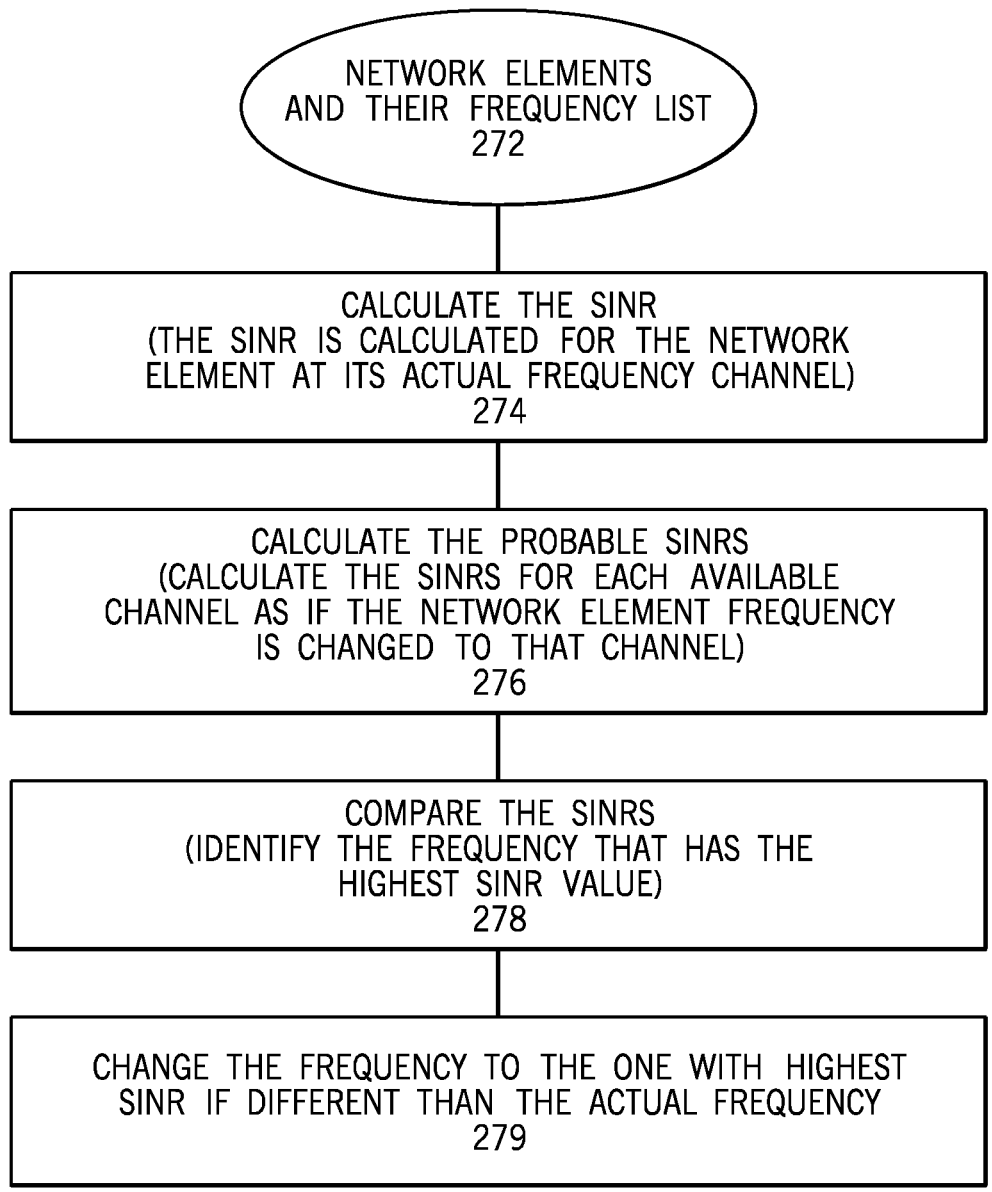
FIG. 10 depicts the self-organizing algorithm for the central system shown in FIG. 1.

Returning to the flowchart in FIG. 3, reference is made to execution step 270 that occurs concurrently with step 260. Step 270 is accomplished with the sub-steps shown in the flowchart of FIG. 10. The flowchart represents central system 40's self organizing network (SON), i.e., a SON that is executed on central system 40. The central system 40 SON works on the server to improve the service quality and availability of a network element and to improve total service level for all users connected to it. The system begins with a list of network elements along with their frequency at 272 (not a step but information to complete following sub-steps). In this context, network elements include WIFI, LTE, UMTS or CDMA macro cell, or LTE, UMTS or CDMA small cell or femtocell. At sub-step 274, the SINR threshold is calculated. The SNIR is calculated for the network element at its actual frequency (channel). At sub-step 276, the probable SINRs are calculated for each available channel as if the network element frequency is changed to that channel. At sub-step 278, the SINRs are compared to determine the channel that has the highest SINR value. Finally, the channel is changed to the channel with one of the highest SINRs if different than the actual one used.

This completes the steps of the flowcharts in FIGS. 2 and 3.

Figure 12:
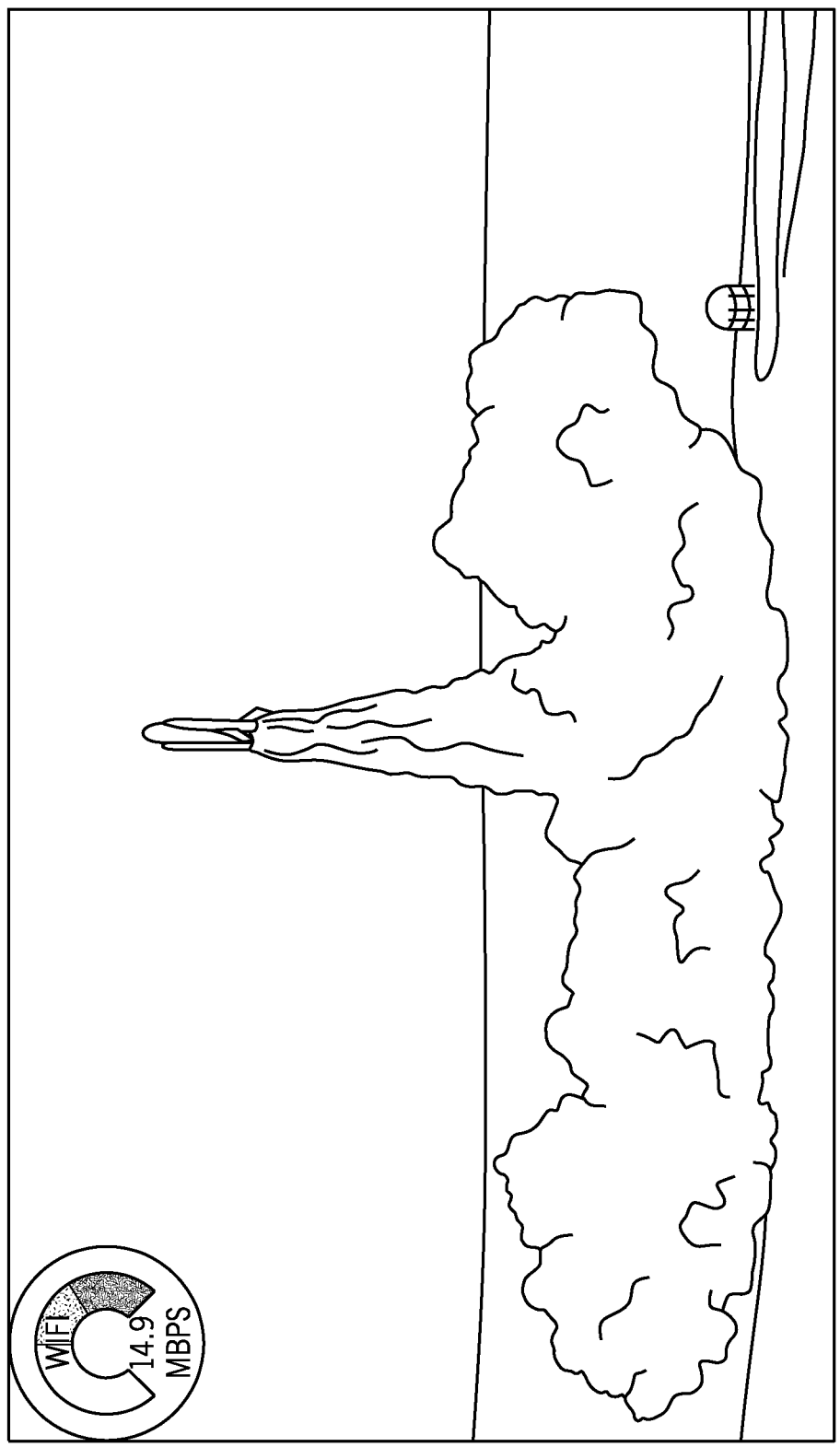
FIG. 12 is a representation of a screenshot of a video from Youtube that depicts a speed gauge that measures the speed in real time in accordance with an embodiment of the present invention.

FIG. 12 is a representation of a (example) screenshot of a video from Youtube on the user's mobile device. The screenshot depicts a speed gauge that appears on the top corner in accordance with an embodiment of the present invention. The speed gauge measures the speed in real time. The gauge appears automatically when there is data transmission and disappears when transmission has terminated. The gauge helps the mobile device user to understand problems in the delivery of content. The gauge advises on the network speed required to receive or transmit specified content with acceptable service quality.

Figure 13:
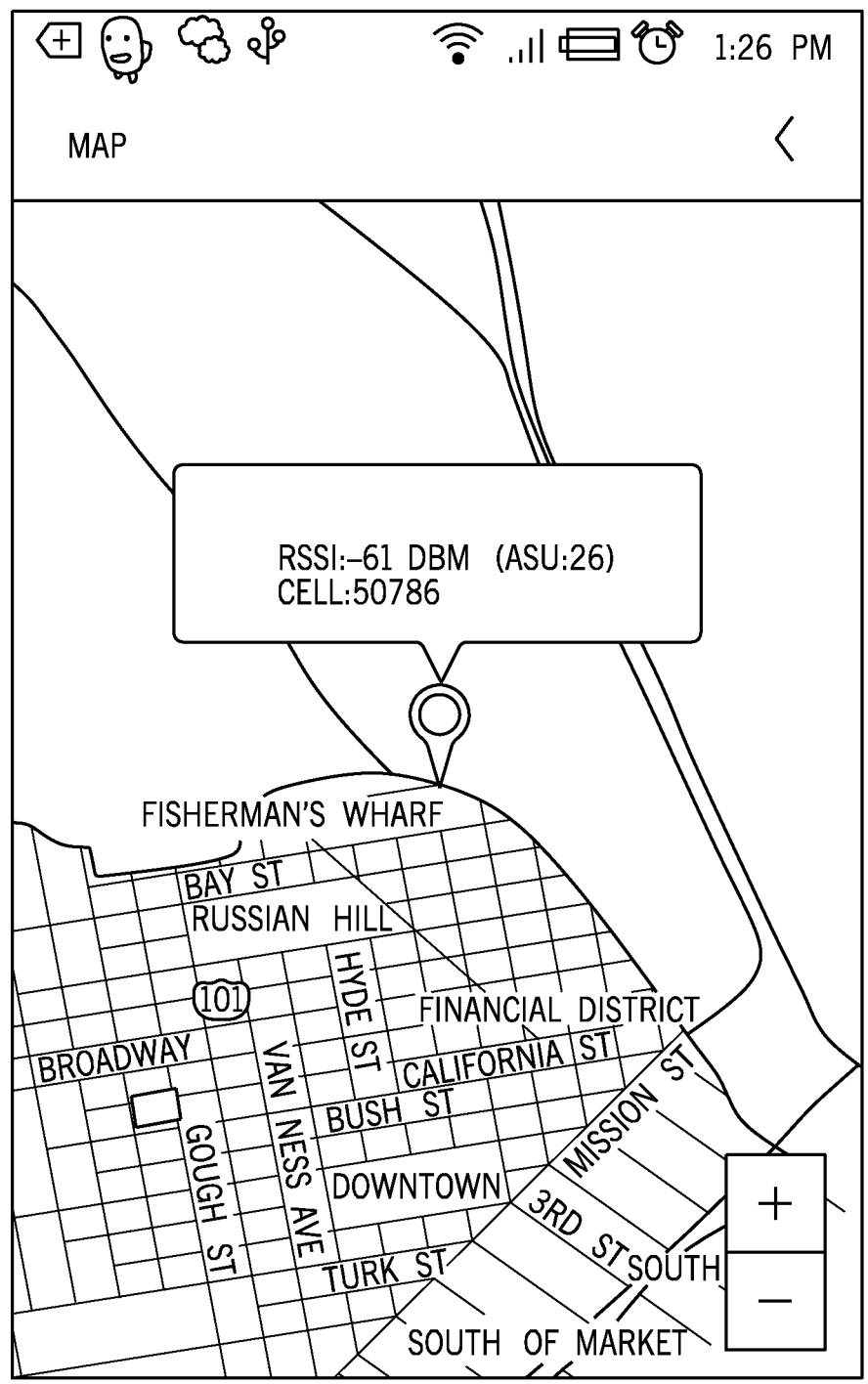
FIG. 13 is a representation of a screenshot on a mobile device depicting a map feature in accordance with an embodiment of the invention.

FIG. 13 is a representation of a (example) screenshot on a mobile device depicting a map feature in accordance with an embodiment of the invention. The feature enables a user to visualize and geolocate the perceived data quality and identify (pinpoint) the radio conditions or speed.

Figure 14:
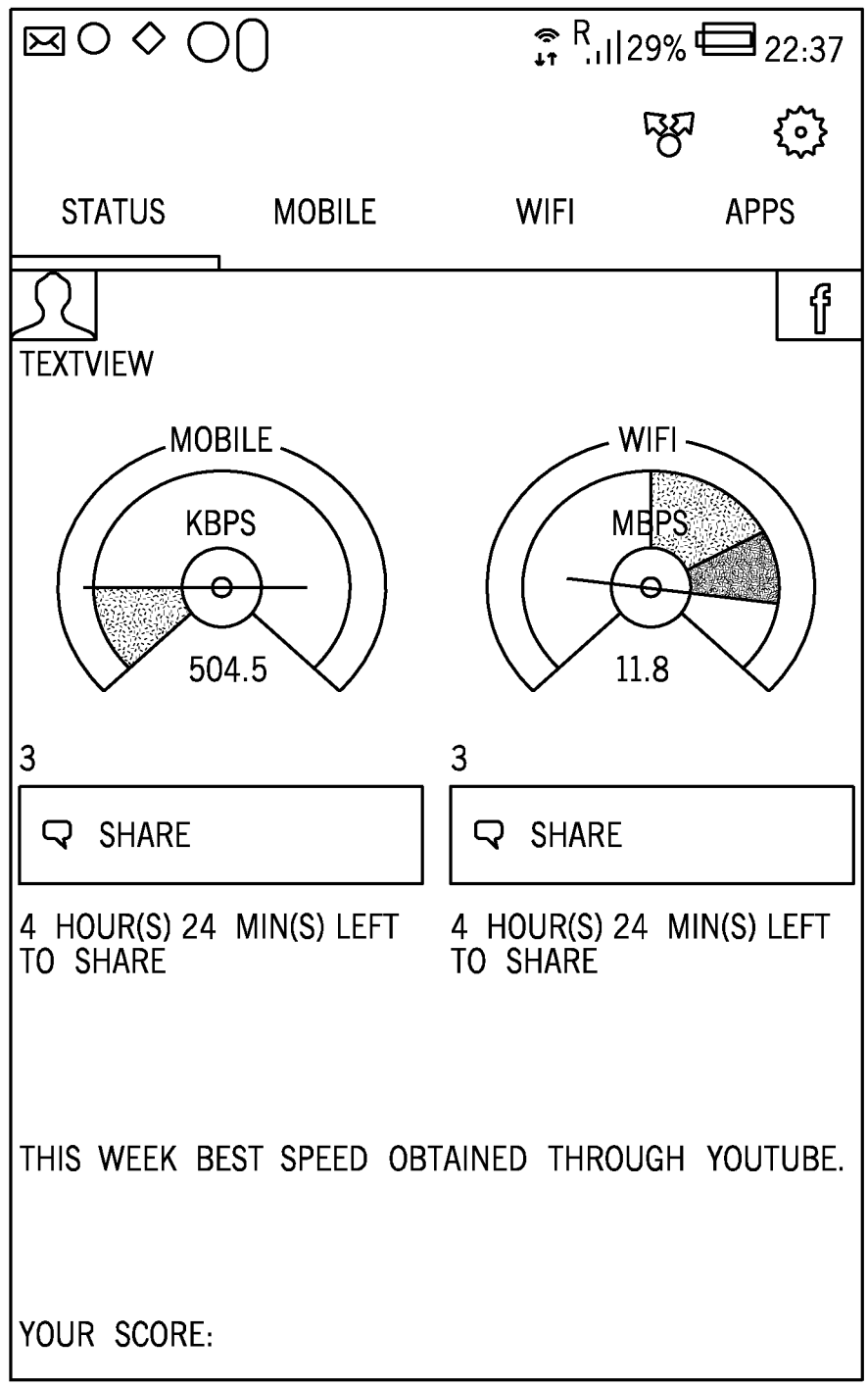
FIG. 14 is another representation of a screenshot on a mobile device depicting a "My Status" tab in accordance with the present invention.

FIG. 14 is another representation of a (example) screenshot on a mobile device depicting a "My Status" tab in accordance with an embodiment of the present invention. The "My Status" tab is used for gaming on a mobile device. The feature educates a user about requirements of the speed per application and the speed capabilities of the WIFI vs. Mobile networks as well as the mobile device itself. The feature aids in the enjoyment. The user is capable of playing with Facebook, Twitter or similar social media friends and share his/her experience of mobile device quality.

FIG. 15 is another representation of a (example) screenshot on a mobile device depicting an "apps" tab. This feature is where the user is able to view the quality and the usage level per each mobile application. The requirement of data and speed usage changes significantly per each application.

High data means more resources used per content. High speed also means more data per second, thus more resources consumed in the network.

The actual application in accordance with the present invention can be downloaded and installed. It aims to create a simple experience for the user. Most of the data that is being collected are not presented in the GUI. In one embodiment of the present invention an interface will present an illustration of speed, separately in Mobile and WiFi. Two widgets are placed on Home screen, to give the latest speed that is recorded, or being recorded by the applications in average. The comparison between Mobile and WiFi is continuously monitored. The major difference between a simple speed test and the speed information in the system and method (application) in accordance with an embodiment of the present invention is that the latter one shows the real data speed average experienced in all the active applications of a mobile device (e.g., smart phone). This is not a test, this is the real experience of the user.

The system and method (application) in accordance with the present invention is capable of measuring and storing the data speed per application, location and/or per time. As the measurements can be made for all applications running simultaneously, the mobile device user can view how each application performs in the network separately. The mobile device user can also understand how the applications affect one another's performance. The user thus can decide how to prioritize between the active applications using the network, as well as be able to visualize and control the background data consuming services. This in return will have positive effects over the user's perception of network quality.

Local WIFI network and carrier network (cellular) information is measured and collected together for example so they can be reported together. That is, it is possible to see the neighboring hotspots of the connected WIFI and the neighboring base stations of the carrier network simultaneously. The measurement and collection of both WIFI and carrier networks enables the system to make comparisons among the networks. This provides options to both a mobile user and a carrier network (operator). The comparison provides the mobile device user to switch networks or terminate the operation of an application that consumes large volumes of data (i.e., quantity). The comparison also provides the mobile (carrier) network (operator) to plan the effective offloading of the best performance/premium subscribers (users) between the carrier network and a WIFI network (and vice versa), simultaneously considering intertechnology offloading conditions (e.g., Mobile to WiFi) as well as offloading in between networks (e.g, CDMA to LTE or WIFI to WIFI). This information can directly be used on a mobile device side for offloading as well as on the network side, for creating strategies for cellular traffic offloading or for opening up some capacity on the base stations. The Base Station WiFi neighbor pattern, together with the capacity, quality and coverage conditions of both networks can be used in Self Organizing Network (SON) Algorithms, such as Load balancing (3GPP-LB), Cell Outage Compensation (3GPP-COC) and Energy Saving Management (3GPP-ESM). (3GPP means third generation partnership Project. ESM refers to saving the energy of a base station when there is no need for its service. The base station is deactivated when not necessary, and activate it back if need be. COC (cell outage compensation) refers to automatically increasing the coverage area of a cell when a neighboring cell becomes unexpectedly unavailable, so that the cell can take its service over. LB (Load balancing) is distributing the traffic load evenly between several cells in the same technology (LTE-LTE) or in different technologies (LTE-WiFi), etc.) The mobile operator can use such information in mobile analytics tools, as to follow their subscribers quality even when they are out of their network or continue the subscriber profiling even when in a WIFI network.

FIG. 16 depicts a block diagram of a general purpose computer to support the embodiments of the systems and methods disclosed in this application. In a particular configuration, the general purpose computer is a computer server 400 that is configured to enable part or all of the execution of the software application (method) steps in accordance with the embodiments in this disclosure. The computer server 400 typically includes at least one processor 402 and system memory 404 (volatile RAM or non-volatile ROM). The system memory 404 may include computer readable media that is accessible to the processor 402 and may include instructions from processor 402, an operating system 406 and one or more application 408 such as Java and a part of an application software 410 in accordance with the present invention. Computer 400 will include one or more communication connections such as network interfaces 412 to enable the computer to communication with other computers over a network, storage 416 such as a hard drives, video cards 414 and other conventional components known to those skilled in the art. Computer server 400 typically runs Unix or Microsoft as the operating system and include TCP/IP protocol stack (to communicate) for communication over the Internet as known to those skilled in the art. Program Data 418 is also stored within computer server 400. A display 420 is optionally used.

Figure 17:
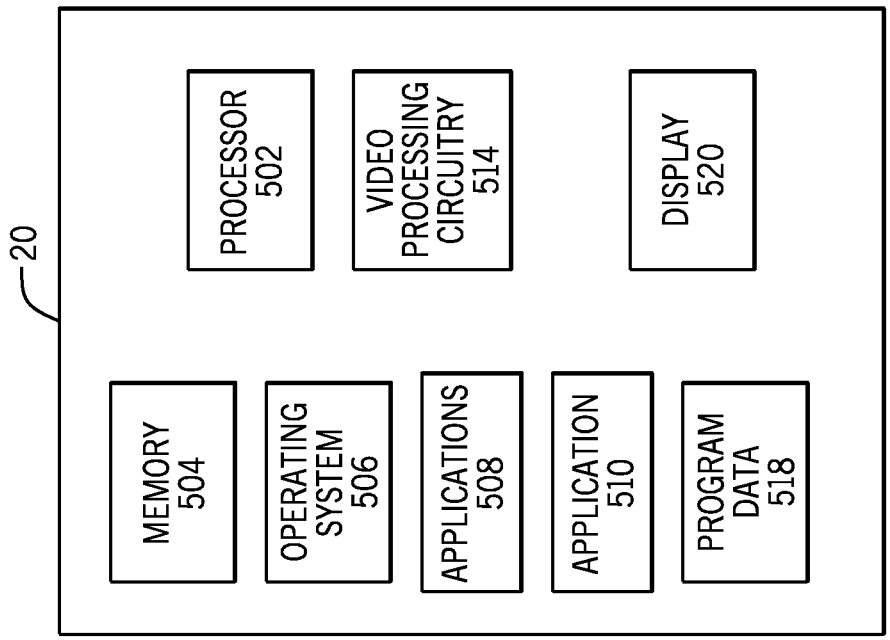
FIG. 17 depicts a block diagram of a mobile device to support the embodiments of the system and method disclosed in this application.

FIG. 17 depicts a block diagram of a mobile device to support the embodiments of the systems and methods disclosed in this application. In a particular configuration, mobile device 20 (as an example) is configured to enable part or all of the execution of the software application (method steps) in accordance with the embodiments in this patent application. Mobile device 20 typically includes at least one processor 502 and system memory 504 (volatile RAM or non-volatile ROM). Memory 504 may include computer readable media that is accessible to the processor 502 and may include instructions from processor 502, an operating system 506 and one or more applications 508 such as a web browser and a part of the application software 510 in accordance with the present invention. Mobile device 20 will also include one or more communication connections such as network interfaces 412 (including an antenna) to enable the mobile device 20 to communication wirelessly with a tower if a carrier network, video processing circuitry 514 and other conventional components known to those skilled in the art. Mobile device 20 may run Android, iOS or another operating systems known to those skilled in the art, and it will include TCP/IP protocol stack (to communicate) for communication over the Internet as known to those skilled in the art. Program Data 518 is also stored within mobile device 20. A display 420 is incorporated within mobile device 20 used. This is an example block diagram of a mobile device 20, but other mobile devices may have the same, less or more components than that described as known by those skilled in the art.

It is to be understood that the disclosure teaches examples of the illustrative embodiments and that many variations of the invention can easily be devised by those skilled in the art after reading this entire disclosure and that the scope of the present invention is to be determined by the claims below.

APPENDIX A

Data Collected from Mobile Device
   a. Mobile Device (User Equipment Device ("UE")) Information

| # | Parameter | Description |
|---|---|---|
| 1 | Device Type | UE Type |
| 2 | Device Model | UE Model |
| 3 | OS Name | OS name (IOS, Android) |
| 4 | OS Version | Mobile operating system version |
| 5 | TAC Number | The Type Allocation Code (TAC) is the initial eight-digit portion of the 15-digit IMEI code | b. Operator Information

| # | Parameter | Description |
|---|---|---|
| 1 | Carrier | Subscriber registered operator name |
| 2 | MCC | Mobile Country Code |
| 3 | MNC | Mobile Network Code |
| 4 | Network Type | Serving network type (LTE, UMTS) | c. Subscriber Information

| # | Parameter | Description |
|---|---|---|
| 1 | IMSI Number | International Mobile Subscriber Identity | d. Geographical Location Information

| # | Parameter | Description |
|---|---|---|
| 1 | Latitude | GPS latitude information |
| 2 | Longitude | GPS longitude information | e. Serving LTE Network Information

| # | Parameter | Description |
|---|---|---|
| 1 | Serving LTE Cell ID | Serving LTE network EUtran Cell ID |
| 2 | IP | LTE network IP address |
| 3 | RSRP | Reference Signal Received Power |
| 4 | RSRQ | Reference Signal Received Quality |
| 5 | RSSI | Receive Strength Signal Indicator |
| 6 | SNR | Signal to Noise Ratio |
| 7 | CQI | Channel Quality Indicator |
| 8 | Throughput | Average LTE network DL throughput |
| 9 | LTE Neighbor Cell list | A list of detected LTE neighbor cells |
| 10 | UMTS Neighbor Cell list | A list of detected UMTS neighbor cells | f. Serving CDMA Network Information

| # | Parameter | Description |
|---|---|---|
| 1 | Serving CDMA Cell ID | Serving CDMA network Cell ID |
| 2 | IP | CDMA network IP address |
| 3 | EVDO RSSI | EVDO Receive Strength Signal Indicator |
| 4 | CDMA RSSI | CDMA Receive Strength Signal Indicator |
| 5 | EVDO Eclo | EVDO, The ratio of received pilot energy, to total received energy |
| 6 | CDMA Eclo | CDMA, The ratio of received pilot energy, to total received energy |
| 7 | EVDO SNR | EVDO Signal to Noise Ratio |
| 8 | Throughput | Average EVDO network throughput |
| 9 | CDMA Neighbor Cell list | A list of detected CDMA neighbor cells |
| 10 | LTE Neighbor Cell list | A list of detected LTE neighbor cells | g. Detected WIFI Network Information

| # | Parameter | Description |
|---|---|---|
| 1 | SSID | Service set identification |
| 2 | BSS ID | Basic service set identification |
| 3 | IP | IP address of detected WiFi point |
| 4 | WiFi supported protocols | 802.11a, 802.11b, 802.11g, 802.11n |
| 5 | Bandwidth | Bandwidth |
| 6 | Signal level | WiFi point signal level | h. Mobile Device (UE) Active Application Information
Mobile device application should collect a list of active applications.

| # | Parameter | Description |
|---|---|---|
| 1 | Application | Active application name |
| 2 | Mobile data usage | Amount of DL data through mobile network |
| 3 | Mobile throughput | Mobile network DL throughput |
| 3 | WiFi data usage | Amount of DL data through WiFi network |
| 4 | WiFi throughput | WiFi network DL throughput |
| 5 | Roaming data usage | Amount of data transferred during roaming |
| 6 | Roaming throughput | Average application throughput during roaming |

What is claimed is:

1. A system for determining mobile data quality over a cellular network or WIFI network that enables users to access data content from one or more content providers through the cellular or WIFI network and to communicate with other users via mobile devices through the cellular network or the WIFI network, the system comprising:
   at least one memory for storing computer-executable instructions; and
   at least one processor in communication with the at least one memory, wherein the processor is configured to execute the computer-executable instructions to:
      collect data transmitted by a mobile device of a user over a network at one or more locations, wherein the data transmitted is collected from the mobile device at the one or more locations;
      calculate instantaneous speed of the data transmitted by the mobile device over the network;
      calculate an interference value at the mobile device, the interference value calculated as a function of (1) power measured at the mobile device associated with a signal of a first WIFI network available to that mobile device for data transmission and (2) power measured at the mobile device that is associated with a signal of a second WIFI network available to the mobile device for data transmission;
      calculate a delay for the first WIFI network and second WIFI network available to the mobile device for data transmission; and
      determine an optimal network available to the mobile device for data transmission as a function of the instantaneous speed, interference value and delay, the optimal network determined from the first WIFI network, the second WIFI network or a cellular network available to the mobile device for data transmission.

2. The system of claim 1 wherein the data transmitted by the mobile device includes data volume.

3. The system of claim 1 wherein the computer-executable instructions to determine the optimal network includes instructions to select the first WIFI network, the second WIFI network or a cellular network available to the mobile device for data transmission.

4. The system of claim 1 wherein determining the optimal network comprises:
   calculating an interference threshold value;
   removing the first WIFI network and/or the second WIFI network available to the mobile device that has an interference value that falls below the interference threshold value.

5. The system of claim 4 wherein determining the optimal network further comprises:
   selecting the first WIFI network or the second WIFI network with smallest delay.

6. The system of claim 1 wherein instantaneous speed is calculated using the following formula:

$$\text{Instantaneous speed} = (\text{DataVolume2} - \text{DataVolume1}) / \text{Interval1}$$

whereby, DataVolume1 and DataVolume2 are volumes of data at the beginning and ending of an interval.

7. The system of claim 1 wherein the interference value is the signal interference to noise ratio (SINR) and it is calculated using the following formula:

$$\text{SINR} = \text{Signal Level (at connected WIFI)} - \text{Signal Level of Total Interference}.$$

8. The system of claim 1 wherein the at least one processor is further configured to execute the computer-executable instructions to:
   receive data from a central server collected from a plurality of mobile devices.

9. The system of claim 1 wherein the at least one processor is further configured to execute the computer-executable instructions to:
   transmit the collected data to a central server.

10. The system of claim 1 wherein the instantaneous speed is calculated for one or more user applications.

11. A system for determining mobile data quality over a cellular network or a WIFI network that enables users to access data content from one or more content providers through the cellular network or the WIFI network and to communicate with other users via mobile devices through the cellular network or WIFI network, the system comprising:
   at least one memory for storing computer-executable instructions; and
   at least one processor in communication with the at least one memory, wherein the processor is configured to execute the computer-executable instructions to:
      receive data collected from a mobile device of a user, the mobile device having at least one user application stored on the mobile device and the data collected includes data transmitted by the mobile device over a network in connection with usage of the at least one user application; and
      calculate the average speed of data transmitted over a network in connection with the at least one application;
      calculate signal interference to noise ratio (SINR) values of signals of a plurality of WIFI networks available to a plurality of mobile devices used by a plurality of users, the plurality of mobile devices including the mobile device of the user, wherein the SINR values are calculated as a function of power measured at the plurality of mobile devices associated with signals of the plurality of WIFI networks available to the plurality of mobile devices for data transmission; and
      transmit data to the mobile device, the data including the average speed of data and the SINR values so as to enable a WIFI network or cellular network to be selected that is available to the mobile device for data transmission.

12. The system of claim 11 wherein the at least one processor is further configured to execute the computer-executable instructions to:
   calculate a plurality of loads associated with the plurality of mobile devices in an area.

13. The system of claim 12 wherein the at least one processor is further configured to execute the computer-executable instructions to:
   wherein the data transmitted to the mobile device further includes the load data associated with the plurality of mobile devices.

14. The system of claim 11 wherein the average speed of data is calculated using the following formula:

$$\text{Average Speed} = \Sigma((\text{DataVolume}/\text{Time}) * \text{DataVolume}\phi) / (\Sigma \text{DataVolume})$$

where datavolume$\phi$ is the amount of data delivered and $\Sigma$ DataVolume is the summation of data volume.

15. The system of claim 11 wherein the signal interference to noise ratio (SINR) is calculated using the following formula:

$$\text{SINR} = \text{Signal Level (at connected WIFI)} - \text{Signal Level of Total Interference}.$$

16. A method for determining mobile data quality over a cellular or WIFI network that enables users to access data content from one or content providers through the cellular or WIFI network and to communicate with other users via mobile devices through the cellular or WIFI network, the method comprising:
   receiving, by one or more servers, data collected from a mobile device of a user, the mobile device having at least one user application stored on the mobile device and the data collected includes data transmitted by the mobile device over a network in connection with usage of the at least one user application;
   calculating, by the one or more servers, the average speed of data transmitted over the network in connection with the at least one user application; and
   calculating, by the one or more servers, signal interference to noise ratio (SINR) values of signals of a plurality of WIFI networks available to a plurality of mobile devices used by a plurality of users, respectively, the plurality of mobile devices including the mobile device of the user, wherein the SINR values are calculated as a function of power measured at the plurality of mobile devices associated with signals of the plurality of WIFI networks available to the plurality of mobile devices for data transmission;
   transmit data to the mobile device, the data including the average speed of data and the SINR values so as to enable a WIFI network or cellular network to be selected that is available to the mobile device for data transmission.

17. The method of claim 16 wherein the data transmitted includes data volume.

18. The method of claim 17 further comprising calculating a plurality of loads associated with the plurality of mobile devices.

19. The method of claim 17 wherein the interference (SINR) is calculated using the following formula:

SINR=Signal Level (at connected WIFI)−Signal Level of Total Interference.

20. The method of claim 17 further comprising executing, by the one or more servers, a self organizing network.

21. The method of claim 16 wherein the average data speed is calculated for the at least one user application on the mobile device used by the user.

22. The method of claim 16 wherein the average speed of data is calculated using the following formula:

Average Speed=Σ((DataVolume/Time)*DataVolumeϕ)/(ΣDataVolume)

where datavolumeϕ is the amount of data delivered and Σ DataVolume is the summation of data volume.

23. A system for determining mobile data quality over a cellular or WIFI network that enables users to access data content from one or more content providers through the cellular or WIFI network and to communicate with other users via mobile devices through the cellular or WIFI network, the system comprising:

at least one memory for storing computer-executable instructions; and at least processor in communication with the at least one memory, wherein the processor is configured to execute the computer-executable instructions to:

collect data transmitted by a mobile device of a user over a network, wherein the data transmitted is collected from the mobile device;

calculate instantaneous speed of the data transmitted by the mobile device over the network;

calculate an interference value at the mobile device, the interference value calculated as a function of (1) power measured at the mobile device associated with a signal of a first WIFI network available to that mobile device for data transmission and (2) power measured at the mobile device that is associated with a signal of a second WIFI network available to the mobile device for data transmission;

calculate a delay for the first WIFI network and second WIFI network available to the mobile device for data transmission; and select a network available to the mobile device for data transmission as a function of the instantaneous speed, interference value and delay, the network selected from the first WIFI network, the second WIFI network or a cellular network available to the mobile device for data transmission.

* * * * *